(12) United States Patent
Laverack et al.

(10) Patent No.: US 9,333,922 B2
(45) Date of Patent: May 10, 2016

(54) KAYAK TRANSPORT DEVICE FOR A VEHICLE

(71) Applicant: THULE SWEDEN AB, Hillerstorp (SE)

(72) Inventors: John Laverack, Southbury, CT (US);
Greg G. Weaver, Waterbury, CT (US);
David Mathieu, Colchester, CT (US);
Joseph Paul, Thomaston, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/749,376

(22) Filed: Jun. 24, 2015

(65) Prior Publication Data
US 2015/0291106 A1    Oct. 15, 2015

Related U.S. Application Data (63) Continuation of application No. 14/236,577, filed as application No. PCT/US2012/049062 on Jul. 31, 2012, now Pat. No. 9,067,522.

(60) Provisional application No. 61/513,941, filed on Aug. 1, 2011.

(51) Int. Cl.
| | |
|---|---|
| *B60P 3/10* | (2006.01) |
| *B60R 9/08* | (2006.01) |
| *B60R 9/045* | (2006.01) |
| *B60R 9/04* | (2006.01) |

(52) U.S. Cl.
CPC .............. *B60R 9/04* (2013.01); *B60P 3/1008* (2013.01); *B60R 9/045* (2013.01); *B60R 9/08* (2013.01)

(58) Field of Classification Search
CPC ........................................... B60R 9/08
USPC ............ 224/319, 324, 507, 282; 16/243, 265, 16/266, 328, 329, 351
See application file for complete search history.

(56) References Cited

U.S. PATENT DOCUMENTS

| | | | | |
|---|---|---|---|---|
| 3,848,785 | A * | 11/1974 | Bott .............................. | 224/319 |
| 7,111,364 | B2 * | 9/2006 | Bader et al. ...................... | 16/436 |
| 7,810,686 | B2 * | 10/2010 | Ilgenfritz .................. | B60R 9/08 224/310 |
| 9,067,522 | B2 * | 6/2015 | Laverack et al. | |
| 2009/0120982 | A1 * | 5/2009 | Sautter et al. .................. | 224/323 |

* cited by examiner

*Primary Examiner* — Justin Larson
(74) *Attorney, Agent, or Firm* — Sterne, Kessler, Goldstein & Fox P.L.L.C.

(57) ABSTRACT

A kayak holder configurable between an open, load-receiving configuration and a closed, stored configuration can include an elongate support arm and a base. The base can be releasably mountable upon a load bar of a carrying vehicle. The elongate support arm can be anchored to a hub having an axle rotatably coupled to the base. The base can comprise a keyway assembly that releasably receives a mating key assembly on the axle. A biasing member interposed longitudinally between the axle and the base configured to bias the at least one support arm toward a locked position. The at least one support arm is unidirectionally axially displaced relative to the base between the locked position and an unlocked position.

10 Claims, 13 Drawing Sheets

KAYAK TRANSPORT DEVICE FOR A VEHICLE

CROSS-RELATED APPLICATIONS

This application is a continuation of U.S. patent application Ser. No. 14/236,577 filed on May 23, 2014, which is a National Stage Application of International Application No. PCT/US2012/049062 filed on Jul. 31, 2013, which claims the benefit of U.S. Provisional Application No. 61/513,941 filed on Aug. 1, 2011, each of which applications are fully incorporated by reference herein.

FIELD OF TECHNOLOGY

The instant disclosure relates to transport carriers, and more specifically, to a kayak holder.

BACKGROUND OF THE INVENTION

Many of today's vehicles are equipped with roof racks for stowing cargo. Such roof racks typically include feet or towers that are mounted to the roof of the vehicle and that support a plurality of transversely extending load beams. The load beams typically support cargo above the roof of the vehicle and provide structures for tying down and securing the cargo.

Although providing a basic structure for supporting cargo upon the roof of the vehicle, such roof racks are not well suited for supporting elongate, irregularly shaped cargo, such as various watercrafts, surfboards, ski equipment and the like. In particular, securely mounting such elongate cargo to and upon the transverse load beams is difficult. Moreover, the elongate cargo is susceptible to shifting and possible damage.

Another problem associated with merely using a conventional roof rack or the aforementioned mounting arrangements to support the elongated cargo is the extremely difficult task of loading or unloading elongated cargo onto or off of the roof rack or mounting arrangement. Because such elongated cargo is frequently heavy or extremely awkward to handle, maneuvering and positioning such elongated cargo onto the roof rack or onto the roof-mounting arrangement on top of the roof rack is tedious, time consuming and strenuous. In an attempt to provide easier loading and unloading of elongated cargo onto and off of a vehicle roof rack, a multitude of loading arrangements have been developed. However, known loading arrangements are extremely complex, difficult to manipulate and difficult to mount to an existing roof rack.

BRIEF DESCRIPTION OF THE DRAWINGS

Implementations of the present application will now be described, by way of example only, with reference to the attached Figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

A kayak holder for a vehicle mounted load carrier, in accordance with the present disclosure is configurable between an open, load-receiving configuration and a closed, stored configuration. The kayak holder can include a base and an elongate support arm. The base can be releasably mountable upon a load bar of a carrying vehicle. A hub having an axle can be rotatably coupled to the base. The elongate support arm can be anchored to the hub. The axle can have a mating key assembly thereon. The base can also include a keyway assembly. The keyway assembly can releasably receive the mating key assembly on the axle. The elongate support arm can have a locked position relative to the base. In the locked position, the key assembly can be interference-engaged in the keyway assembly. The elongate support arm can also have an unlocked position relative to the base. In the unlocked position, the key assembly axially can be displaced from the locked position out of interference-engagement with the keyway assembly. When the elongate support arm is in the locked position, the kayak holder can be in the open, load-receiving configuration. In the open, load-receiving configuration, the holder can receive a kayak or other article to be secured to and transported by the carrying vehicle. When the elongate support arm is in the unlocked position, the elongate support arm is rotatable with respect to the base. For example, in the unlocked position, the elongate support arm can be rotated towards the load bar of the carrying vehicle and towards the base of the kayak holder. Additionally, when the elongate support arm is in the unlocked position, the elongate support arm can be rotated towards the carrying vehicle, thereby placing the kayak holder in a closed, stored configuration.

Figure 1:
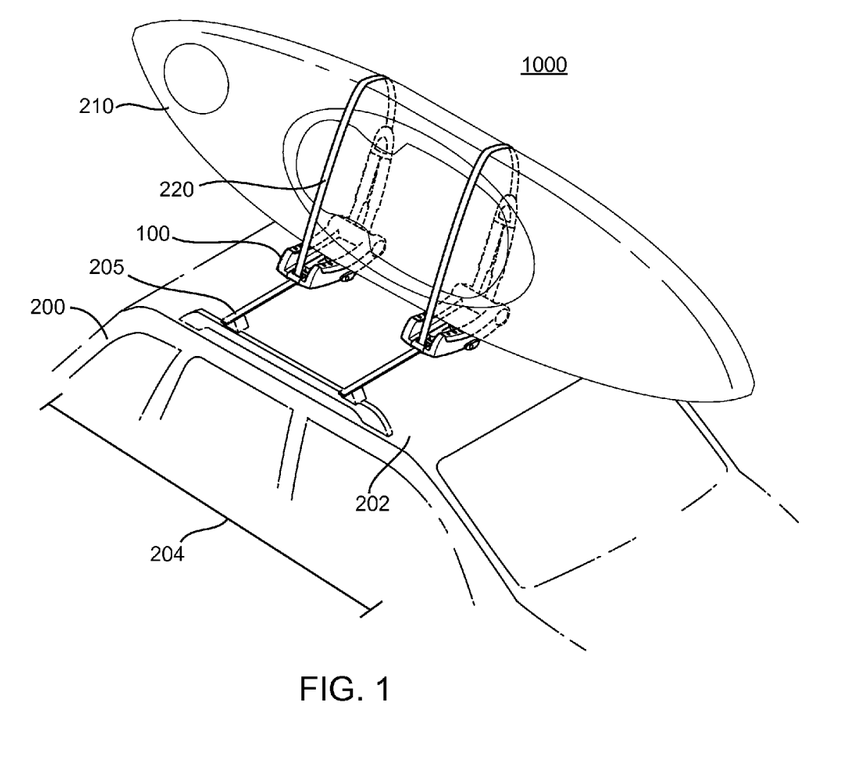
FIG. 1 illustrates a kayak secured to a kayak holder, in accordance with an example embodiment of the present disclosure, as assembled onto a carrying vehicle.

FIG. 1 illustrates a kayak holder in accordance with an example embodiment of the present disclosure assembled onto a carrying vehicle. In FIG. 1, the kayak holder 100 is in the open, kayak-receivable configuration 1000. The kayak holder 100 is mounted onto a carrying vehicle 200. For example, the kayak holder 100 can be mounted onto a load bar 205 on the roof of the carrying vehicle 200. In other embodiments, the kayak holder 100 can be mounted onto a load bar 205 elsewhere on the carrying vehicle 200, such as the trunk or the truck bed of the carrying vehicle 200. Also illustrated in FIG. 1, a kayak 210 is received by the kayak holder 100. For example, the kayak 210 is secured to the kayak holder 100 such that the kayak 210 is oriented lengthwise on the roof 202 of the carrying vehicle 200 and parallel to the length 204 of the carrying vehicle 200. The kayak 210 can be secured to the kayak holder 100 by a securement member 220. For example, in FIG. 1, the kayak 210 is secured to the kayak holder 100 by a strap 220, but the kayak 210 can also be secured by a cord, a rope, or other securement member.

Figure 2:
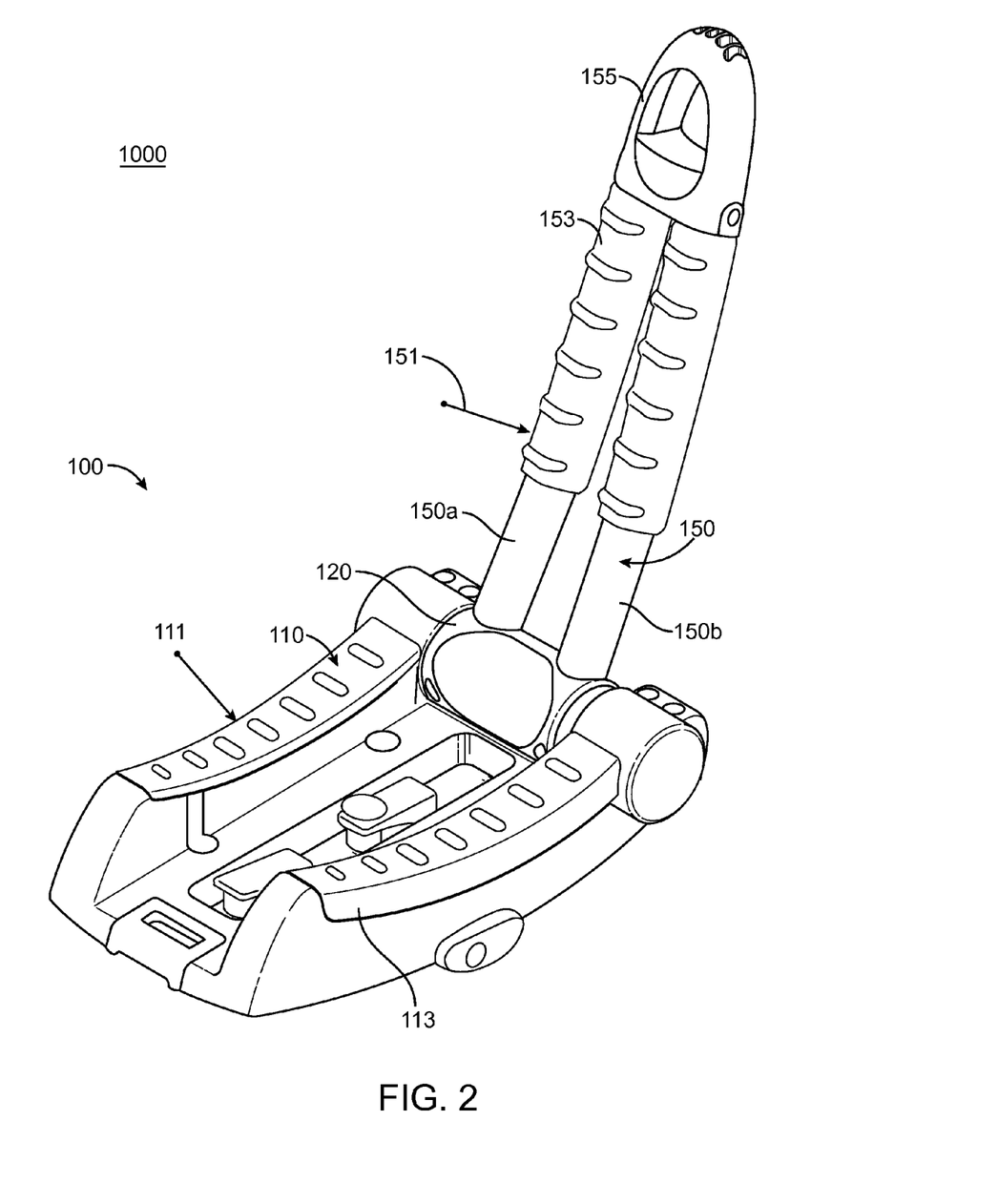
FIG. 2 is a perspective view of a kayak holder, in accordance with an example embodiment of the present disclosure, in an open, load-receiving configuration.

FIG. 2 is a perspective view of an example embodiment of a kayak holder 100 in accordance with the present disclosure. As illustrated in FIG. 2, the kayak holder 100 includes a base 110 coupled to a hub 120. The base 110 can be releasably mounted upon a load bar of a carrying vehicle (for example, as illustrated in FIG. 1). An elongate support arm 150 can be anchored to the hub 120. The hub 120 includes an axle 125 (shown in FIG. 4). As the elongate support arm 150 is anchored to the hub 120, which includes the axle 125, the elongate support arm 150 can be rotatable with respect to the base 110. In the example embodiment in FIG. 2, the elongate support arm 150 can be an A-shaped frame. For example, the elongate support arm 150 can include a pair of arms 150a-b anchored to the hub 120 at one end of the pair of arms 150a-b. The opposite end of the pair of arms 150a-b can be coupled to a handle 155. The coupling of the pair of arms 150a-b to the hub 120 and the handle 155 can form an A-shape with respect to the base 110. The handle 155 can be grippable by a user. For example, the handle 155 can be gripped by a user to assist in rotating the elongate support arm 150 with respect to the base 110. Although, FIG. 2 illustrates an elongate support arm 150 having an A-shape frame, those skilled in the art will appreciate that the elongate support arm 150 have other shapes. For example, the elongate support arm 150 can have a U-shaped frame, can be a solid member, or any other structure which can support an article such as a kayak and which can be anchored to the hub 120 of the kayak holder 100. Also, as illustrated in FIG. 2, the elongate support arm 150 can be lengthwise arc-shaped. For example, as illustrated in FIG. 2, the elongate support arm 150 can be lengthwise arc-shaped such that the elongate support arm 150 has a radius of curvature 151. The radius of curvature 151 can approximate a kayak's 200 (shown in FIG. 1) lower surface for accommodating a substantial conformance fit between the arm 150 and a kayak-bottom in a loaded configuration 1000. That is, the radius of curvature 151 and the length-wise arc-shape of the support arm 150 can assist in ensuring that the kayak or article received by the kayak holder 100 is secured to the kayak holder 100. Also illustrated in FIG. 2, the elongate support arm 150 can include pads 153. The pads 153 can be made of an elastic material, such as plastic, rubber, or other elastomer. The pads 153 can provide a cushion on which a kayak or other article can rest, thereby protecting the surface of the kayak or article during transport.

In another embodiment, the base 110 can be lengthwise arc-shaped. For example, the base 110 can have a radius of curvature 111. The radius of curvature 111 of the base 110 can accommodate a substantial conformance fit between the base 110 and a kayak 200 received in the loaded configuration 1000. Also illustrated on FIG. 2, the base 110 can include a cushion 113. The cushion 113 can be made of an elastic material, such as plastic, rubber, or other elastomer. The cushion 113 can protect the surface of the kayak or article when the kayak or article is received by the kayak holder 100.

In FIG. 2, the kayak holder 100 is in the open, kayak-receivable configuration 1000. That is, the elongate support arm 150 has been rotated into the locked position 1500 thereby allowing a kayak or other article to be received by the kayak holder 100. For example, in FIG. 2, the kayak holder 100 is in the open, kayak-receivable configuration 1000, and the elongate support arm 150 is in the locked position 1500 (illustrated in FIG. 4). In the locked position 1500, the elongate support arm 150 is in a substantially upright orientation with respect to the base 110. As the elongate support arm 150 is substantially upright, the kayak or other article can be received by the base 110 and can rest, lean, or be supported by the elongate support arm 150.

Figure 3:
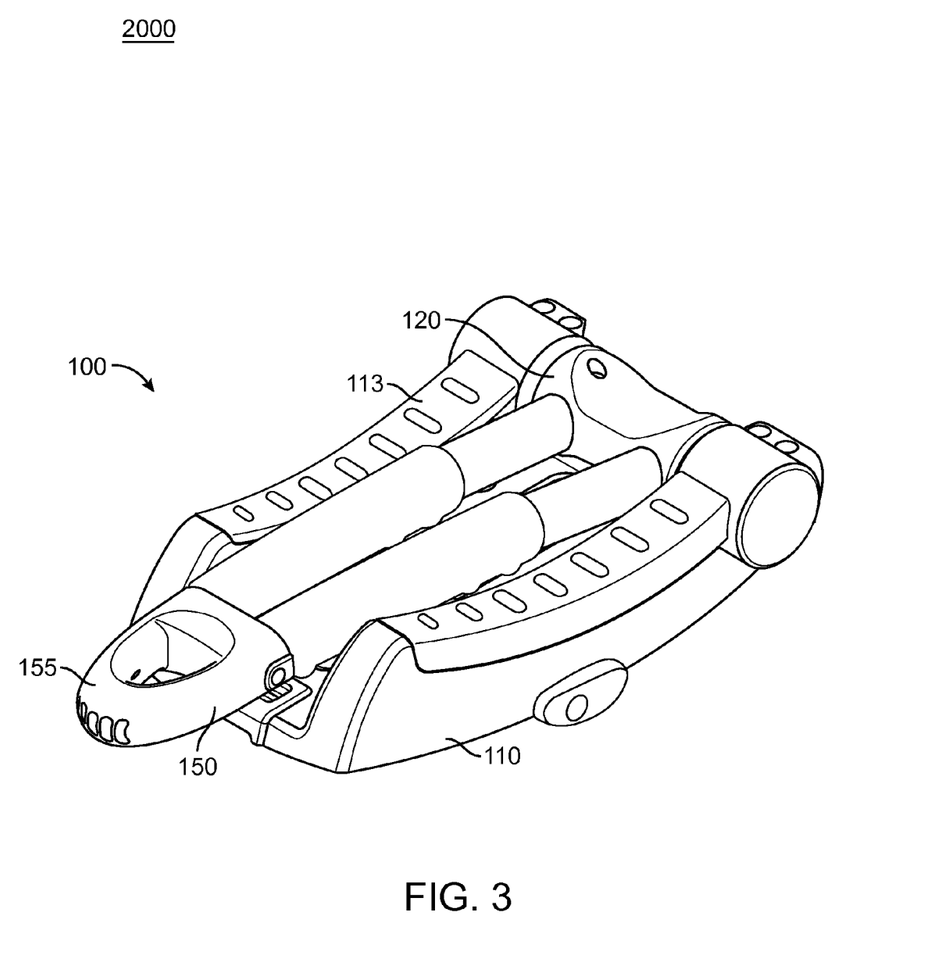
FIG. 3 is a perspective view of a kayak holder, in accordance with an example embodiment of the present disclosure, in an closed, stored configuration.

FIG. 3 illustrates the kayak holder 100 illustrated in FIG. 2 in a closed, stored configuration 2000. In at least one embodiment, in the closed, stored configuration 2000, the elongate support arm 150 has been positioned out of the locked position 1500 and into the unlocked position 2500 (shown in FIG. 7), and the elongate support arm 150 has been rotated towards the base 110 such that the elongate support arm 150 is substantially parallel with base 110.

Figure 4:
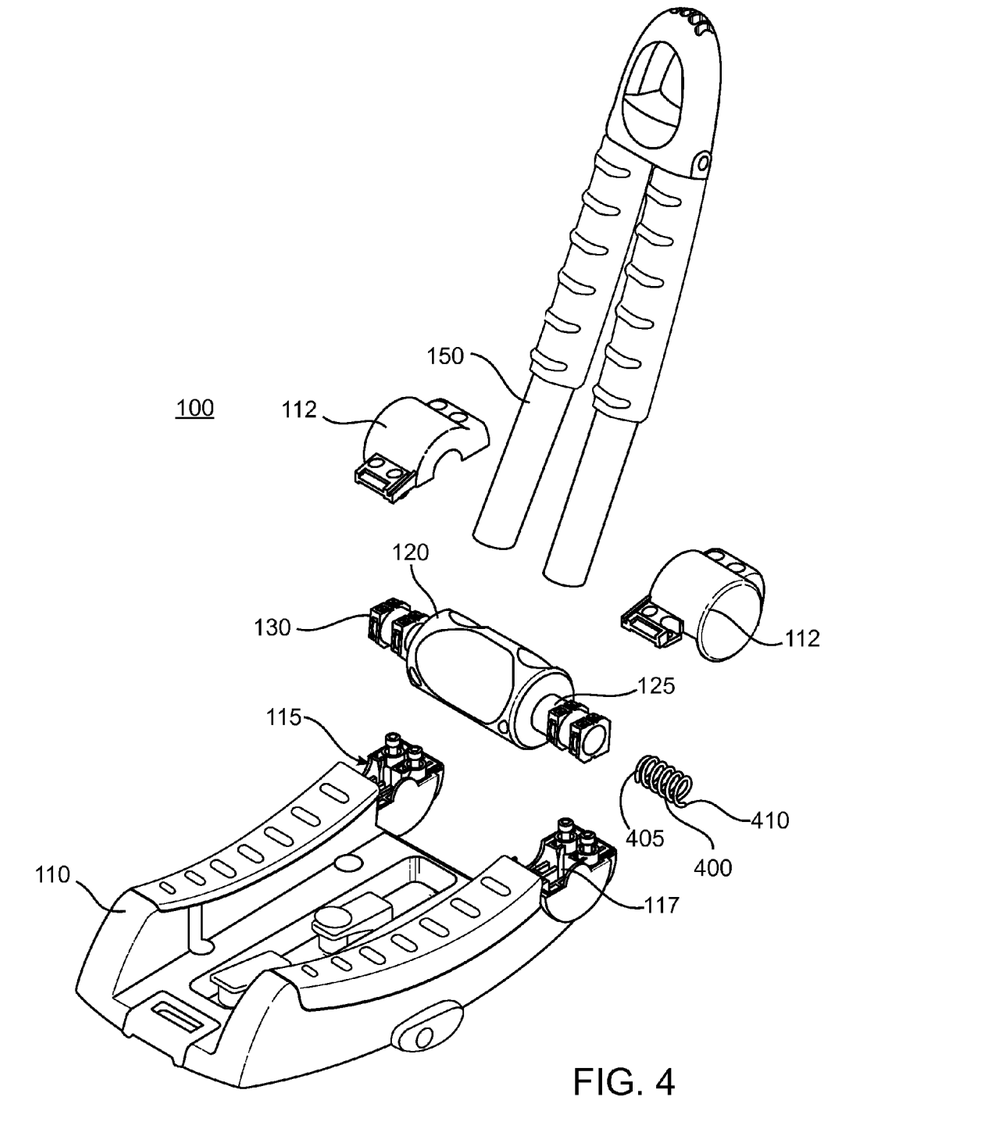
FIG. 4 is an exploded view of a kayak holder in accordance with an example embodiment of the present disclosure.

FIG. 4 illustrates an exploded view of a kayak holder 100 in accordance with an example embodiment of the present disclosure. As illustrated in FIG. 4, the kayak holder 100 includes the elongate support arm 150 anchored to a hub 120. The hub 120 can include an axle 125 that is rotatably coupled the base 110. The axle 125 allows the hub 120 to rotate, thereby allowing the elongate support arm 150 to be rotatable with respect to the base 110. Also illustrated in FIG. 4, the axle 125 can include a key assembly 130. In FIG. 4, the axle 125 includes a key assembly 130 at each end of the axle 125. The key assembly 130 is configured to matingly engage with a keyway assembly 115 of the base 110 in the locked position 1500 (shown in FIGS. 5 and 6). The keyway assembly 115 is formed at one end of the base 110 and is adapted to receive an end of the axle. The keyway assembly 115 can include a keyway 117. The keyway 117 can be a channel formed in the base 110 and adapted to rotatably couple the axle 125 to the base 110. The interaction between the keyway assembly 115 and the key assembly 130 of the axle 125 can provide the locked position 1500 and the unlocked position 2500 of the elongate support arm 150, as will be discussed in further detail below. In FIG. 4, the base 110 includes two keyway assemblies 115 formed at the end of the base 110 to which the axle 125 is rotatably coupled. Although FIG. 4 illustrates more than one keyway assembly 115 formed in the base 110, those of ordinary skill in the art will appreciate that one keyway assembly 115 can be formed in the base 110 and still provide the technical advantages of the present disclosure.

Also illustrated in FIG. 4, the kayak holder 100 can include a biasing member 400. The biasing member 400 can be interposed between the axle 125 and the base 110. The biasing member 400 can also be configured to urge the elongate support arm 150 toward the locked position 1500, as will be discussed in further detail below. In FIG. 4, the biasing member 400 can be a coil spring. The coil spring 400 can be in compression and can be positioned within the base of the 110 of the kayak holder 100. For example, the coil spring 400 can be compressed and positioned within the base 110 such that one end 405 abuts the axle 125 and the opposite end 410 abuts the base 110. As the biasing member 400 is configured to bias the elongate support arm 150 towards the locked position 1500, the biasing member 400 biases the kayak holder 100 into the open, kayak-receivable configuration 1000. Such position protects the kayak or article received by the kayak holder 100, as the elongate support arm 150 is biased in the substantially upright orientation and away from the kayak or article, which thereby prevents the elongate support arm 150 from inadvertently collapsing on the kayak 200. Also illustrated in FIG. 4, the kayak holder 100 can also include a cover 112 can be coupled to the base at the location of the keyway assemblies 117 to cover the axle 120 when the axle is received in the keyway assembly 130.

Figure 5:
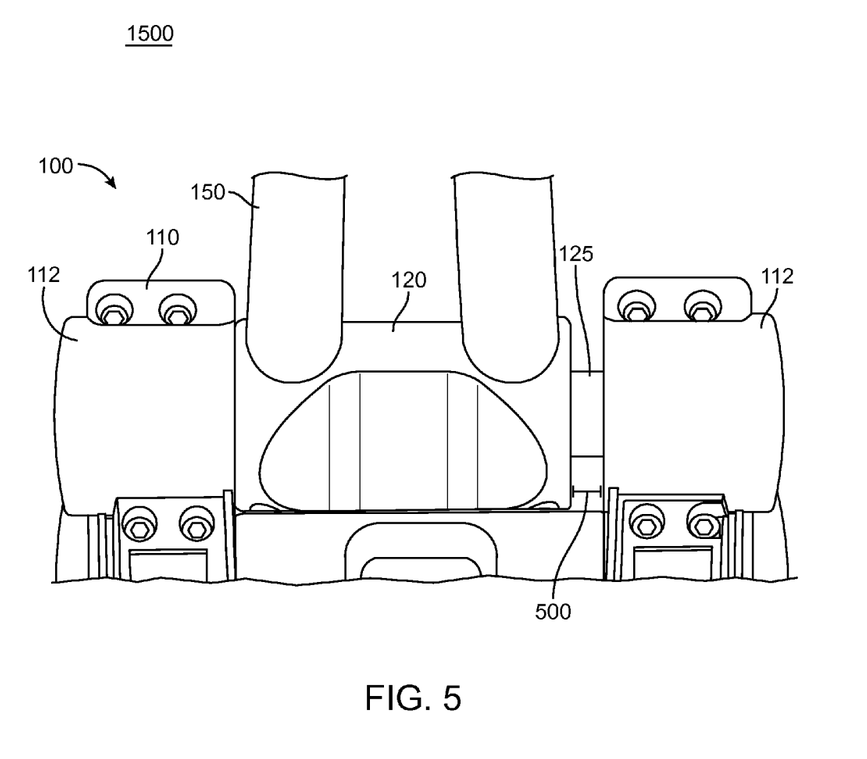
FIG. 5 is a close-up view of the hub, axle, and a portion of the elongate support arm of a kayak holder, in accordance with an example embodiment of the present disclosure, with the elongate support arm in the locked position.

FIG. 5 is a close-up view of the hub 120, axle 125, and a portion of the elongate support arm 150 of a kayak holder 100 in accordance with an example embodiment of the present disclosure with the elongate support arm 150 in the locked position 1500. As illustrated in FIG. 5, the elongate support arm 150 is biased towards the locked position 1500 in which the elongate support arm 150 is in a substantially upright orientation with respect to the base 110. Although not illustrated in FIG. 5, the biasing member 400 (shown in FIG. 4), urges the elongate support arm 150 towards the end of the base 110 that is opposite to the end which the biasing member 400 abuts. For example, in FIG. 5, the biasing member 400 urges the elongate support arm 150 towards the left-hand side of the base 110. Also illustrated in FIG. 5, as the elongate support arm 150 is urged towards the side of the base 110 opposite to the side which the biasing member 400 abuts, a gap 500 is formed between the portion of the hub 120 to which the elongate support arm 150 is anchored and the side of the base 110 which houses the biasing member 400.

Figure 6:
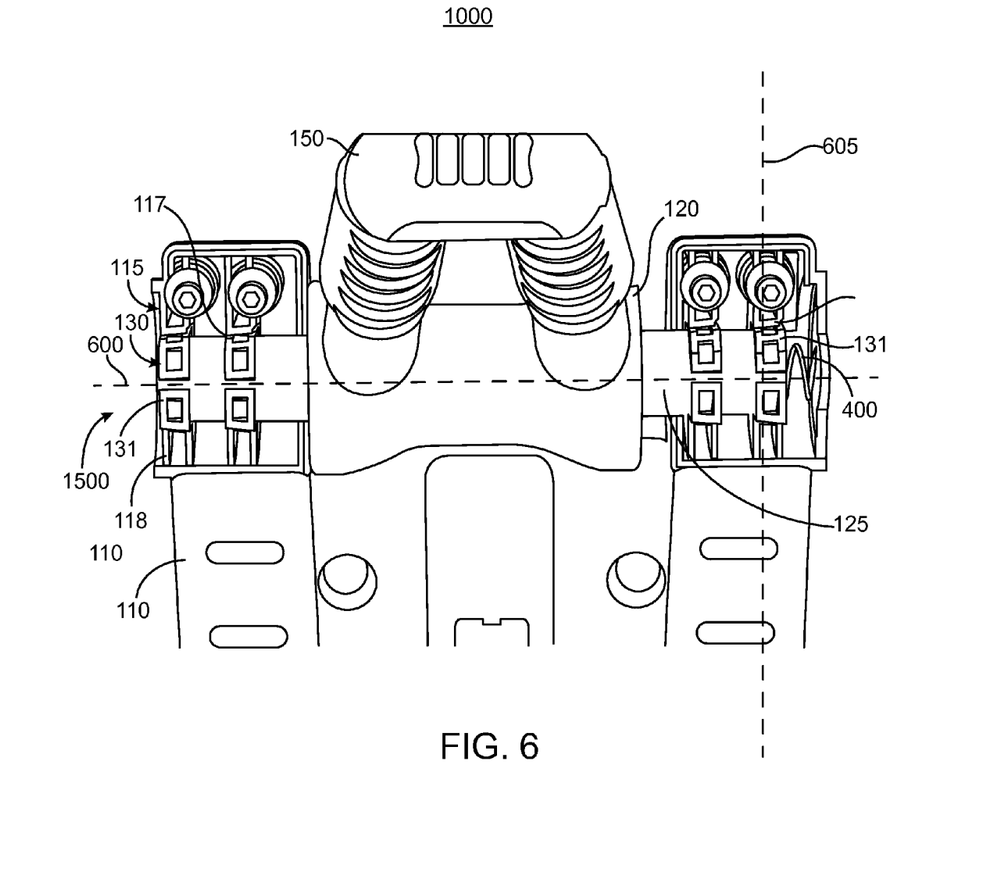
FIG. 6 is a cut-away view of the base of a kayak holder, in accordance with an example embodiment of the present disclosure, illustrating the interaction of the key assembly of the axle and the keyway assembly of the base when the elongate support arm is in the locked position and the kayak holder is in the open, kayak-receivable configuration.

FIG. 6 is a cut-away view of the base 110 of a kayak holder 100 depicted in FIG. 5. FIG. 6 illustrates the interaction of the key assembly 130 of the axle 125 and the keyway assembly 115 of the base 110 when the elongate support arm 150 is in the locked position 1500 and the kayak holder 100 is in the open, kayak-receivable configuration 1000. As illustrated in FIG. 6, in the locked position 1500, the key assembly 130 of the axle 125 is interference-engaged in the keyway assembly 115 of the base 110. For example, in at least one embodiment, the biasing member 400 urges the elongate support arm 150 and the axle 125 towards the side of the base 110 opposite to the biasing member 400, thereby urging the key assembly 130 of the axle 125 into interference-engagement with the keyway assembly 115. As illustrated in FIG. 6, in at least one embodiment, the key assembly 130 includes at least one key 131 adapted for interference-engagement with the keyway assembly 115 of the base 110. In FIG. 6, the key assembly 130 includes a plurality of keys 131 disposed on each end of the axle 125. In FIG. 6, each end of the axle 125 has a two pairs of keys 131. Each pair of keys 131 are axially spaced from one another. That is, the axial direction of the axle is the direction parallel to the longitudinal axis of the axle 125. Also, the keys 131 of each pair can be disposed on the axle 125 such that the keys 131 of each pair are mirror images of each other. The keys 131 can be square protrusions disposed on an exterior surface of the axle 125. In other embodiments, the key 131 can be any other shaped protrusion so long as the key 131 can be adapted for interference-engagement with the keyway assembly 115.

Also illustrated in FIG. 6, the keyway assembly 115 can comprise a keyway 117 configured to receive the end of the axle 125 having the key assembly 130. The keyway 117 can be configured such that in the locked position 1500, the key 131 of the key assembly 130 is located in the keyway 117 to block rotation of the elongate support arm 150 relative to the base 110. For example, they key 131 can be conformance-fit in the keyway 117, thereby preventing rotation of the arm 150 relative to the base 110. In at least one embodiment, as illustrated in FIG. 6, the key 131 and the keyway 117 can have complementarily tapered exterior and interior shapes, respectively. The exterior and interior shapes for the key 131 and keyway 117 can flush-engage one with the other in the locked position 1500, as will be explained in further detail with respect to FIG. 8. Returning to FIG. 6, the keyway assembly 115 can comprise a pair of blocking members 118. The blocking members 118 can be symmetrically and radially positioned about the axle 125, when the axle 125 is received by the keyway assembly 115. For example, the blocking members can be symmetrically and radially positioned about a longitudinal axis 600 of the axle 125. In another example, the pair of blocking members 118 can be mirror images, one to the other, on opposite lateral sides of the axle 125, when the axle 125 is received by the keyway assembly 115. In the example embodiment illustrated in FIG. 6, the keyway assembly 115 includes four pairs of blocking members 118 positioned within the base 110. Each of the pairs of blocking members 118 can be positioned to correspond with a pair of keys 131 of the key assembly 130, when the key assembly 130 is located in the keyway 117 of the keyway assembly 115. As illustrated in FIG. 6, the key assembly 130 and the keyway assembly 115 are in substantially alignment with one another in the locked position 1500. That is, in the locked position 150, the key assembly 130 and they keyway assembly 115 are substantially aligned with one another along the radial axis 605 of the axle 125. In such alignment, the keys 131 of the key assembly 130 interference-engage (for example, abut) the blocking members 118 of the keyway assembly 115, thereby preventing rotation of the elongate arm 150 relative to the base 110. In FIG. 6, the keyway assembly 115 can formed in the base 110 of the kayak holder 100. For example, the keyway assembly 115 can be formed in the base 110 such that the keyway assembly 115 includes a top half 116 (illustrated in FIGS. 11 and 13) and a bottom half 114 (illustrated in FIGS. 8, 9, and 13). The bottom half 114 can be formed in the base 110, and the top half 116 can be formed in the cover 112 of the base 110. In other embodiments, the keyway assembly 115 can be removably insertable into the base 110. In such an embodiment, the keyway assembly 115 can be removably insertable to the base but locked against relative rotational motion when the keyway assembly 115 is interference-engaged with the key assembly 130 of the axle 125.

Figure 7:
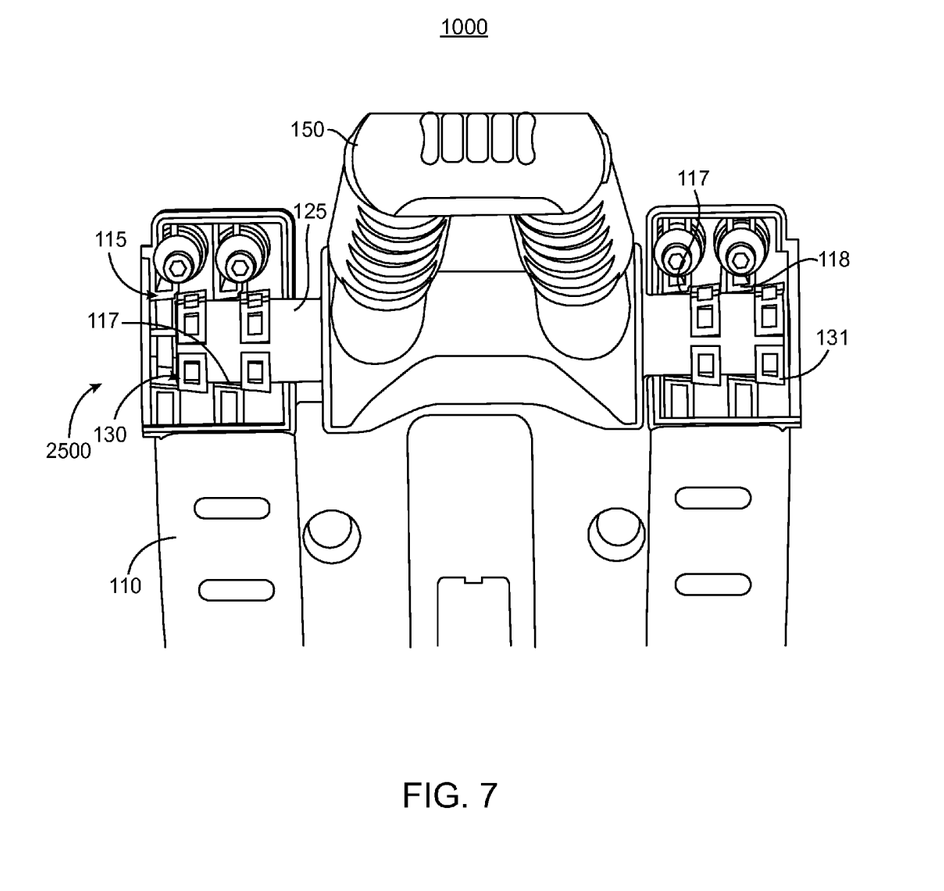
FIG. 7 is a cut-away view of the base of a kayak holder, in accordance with an example embodiment of the present disclosure, illustrating the interaction of the key assembly of the axle and the keyway assembly of the base when the elongate support arm is in the unlocked position and the kayak holder is in the open, kayak-receivable configuration.

FIG. 7 is a cut-away view of the base 110 of a kayak holder 100 as depicted in FIG. 5 but in the unlocked position 2500 of the elongate support arm 150. FIG. 7 also illustrates the interaction of the key assembly 130 of the axle 125 and the keyway assembly 115 of the base 110 when the kayak holder 100 is in the open, kayak-receivable configuration 1000. In FIG. 7, the elongate support arm 150 has been placed in the unlocked position 2500 relative to the base 110, where the key assembly 130 has been displaced from the locked position 1500 out of interference-engagement with the keyway assembly 115. For example, as illustrated in FIG. 7, the elongate support arm 150 has been displaced towards the end of the base 110 housing the biasing member 400 (not shown). The biasing member 400 has been compressed towards the base 110, thereby moving the key assembly 130 out of interference-engagement with the keyway assembly 115. For example, when the elongate support arm 150 has been displaced (for example, pulled, shifted, or otherwise moved) towards the end of the base 110 housing the biasing member 400, the keys 131 of the key assembly 130 disengage the blocking member 118 of the keyway assembly 115. As the key assembly 130 is positioned out of interference-engagement with the keyway assembly 115, the axle 125 is free to rotate with respect to the base 110. For example, the axle 125 can be rotated such that the elongate support arm 150 is rotated towards the base 110. Additionally, with the elongate support arm 150 placed in the unlocked position 2500, the elongate support arm 150 can be rotated towards the base 110 to place the kayak holder 100 in the closed, stored configuration 2000.

Figure 8:
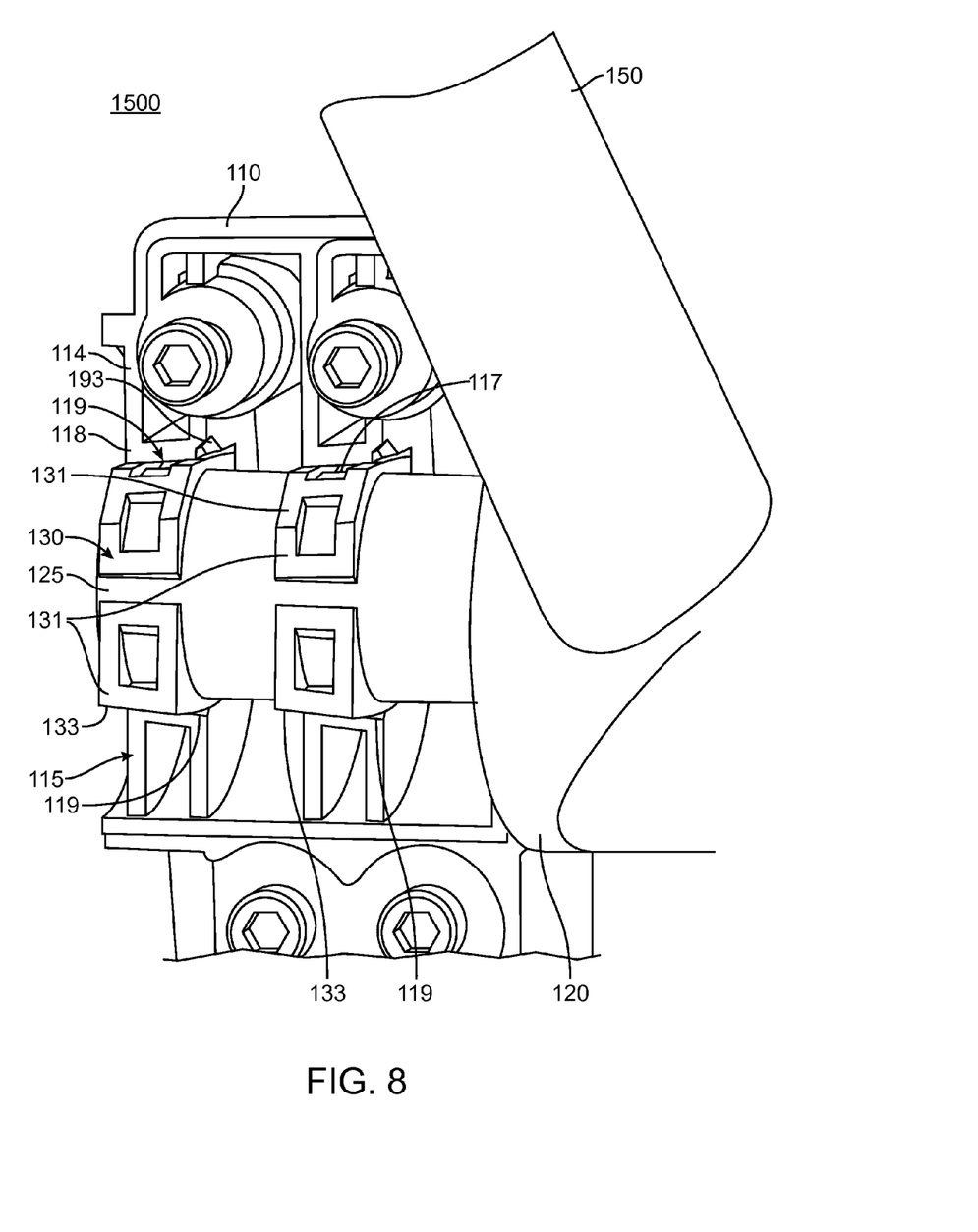
FIGS. 8-11 are close-up views of one end of the axle, in accordance with an example embodiment of the present disclosure, illustrating the interaction of the key assembly of the axle and the keyway assembly of the base as the kayak holder is transitioned from the open, kayak-receivable configuration to the closed, stored configuration.

FIGS. 8-11 are close-up views of one end of the axle 125, in accordance with an example embodiment of the present disclosure, illustrating the interaction of the key assembly 130 of the axle 125 and the keyway assembly 115 of the base 110 as the kayak holder 100 is transitioned from the open, kayak-receivable configuration 1000 to the closed, stored configuration 2000. In FIG. 8, the elongate support arm 150 is in the locked position 1500. That is, in at least one embodiment, the biasing member 400 (not shown) has urged the elongate support arm 150 into the locked position 1500 such that the elongate support arm 150 is in a substantially upright orientation with respect to the base 110. In this locked position 1500, the key assembly 130 of the axle 125 is in interference-engagement with the keyway assembly 115 of the base 110 to prevent the axle 125, and therefore the elongate support arm 150, from rotating. The axle 125 can be prevented from rotation as the key 131 of the key assembly 130 forms a conformance-fit with the keyway 117. That is, the abutment of the key 131 with the keyway 117 prevents the axle 125 from rotation. In at least one example embodiment, as illustrated in FIG. 7, the key 131 and the keyway 117 can have complementarily tapered exterior 133 and interior 119 shapes, respectively, that flush-engage one with the other in the locked position 1500. For example, as illustrated in FIG. 7, at least one of the blocking members 118 has a tapered edge 119 and the key 131 corresponding to the blocking member 131 has a complementarily tapered edge 133. The tapered shapes of the blocking member 118 and the key 131 can enhance the conformance-fit between the keyway 117 and the key assembly 130, thereby ensuring the interference-engagement therebetween to prevent rotation of the axle 125 and support arm 150 relative to the base 110. FIG. 8 also illustrates a detent 193 of the lip portion 191 (shown in FIG. 13) of the keyway assembly 115. The detent 193 can be configured to yieldingly restrain the elongate support arm to the closed, stored configuration. The detent 193 will be described in further detail with respect to FIGS. 12 and 13.

Figure 9:
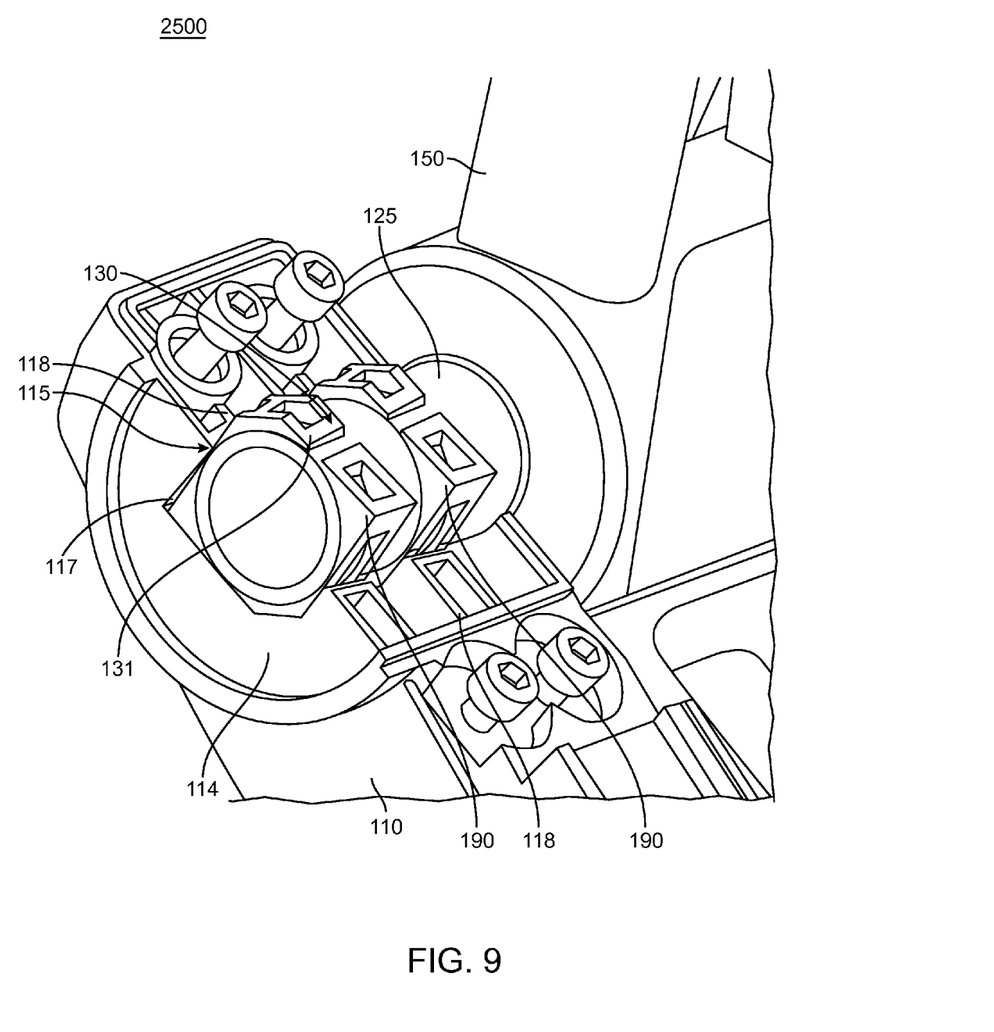

FIG. 9 illustrates the elongate support arm 150 placed in the unlocked position 2500. In FIG. 9, the elongate support arm 150 has been axially displaced (for example, shifted in a direction parallel to the longitudinal axis of the axle 125) out of the locked position 1500. For example, the elongate support arm 150 has been axially displaced towards the side of the base 110 housing the biasing member 400 (not shown). As illustrated in FIG. 9, as the elongate support arm 150 has been axially displaced out of the locked position 1500, the key assembly 130 of the axle 125 is disengaged from the keyway assembly 115. Since the keys 131 of the key assembly 130 are disengaged and no longer abut the blocking member 118 of the keyway assembly 115, the axle 125, and therefore the elongate support arm 150 are free to rotate relative to the base 110. That is, the key assembly 130 has been shifted out of the keyway 117 and into an open portion of the base 110 where the key assembly 115 can rotate without interfering with another surface or member. Also in FIG. 9, the axle 125 can include an abutting engagement assembly 190 configured to abut a lip portion 191 (shown in FIG. 13) of the keyway assembly 130 in the closed, stored configuration 2000, thereby yieldingly restraining the kayak holder 100 in the closed, stored configuration 2000. Details pertaining to the abutting engagement assembly 190 will be discussed in further detail with respect to FIGS. 12 and 13.

Also, in FIG. 9, the complementarily tapered exterior and interior shapes of the key 131 and keyway 117 are illustrated. As illustrated in FIG. 9, the tapered shapes of the key 131 can also minimize binding between the axle 125 and the keyway assembly 130. For example, when the user attempts to fold the elongate support arm 150 into the closed, stored position 2000, the key assembly 130 is less likely to bind with the keyway 117 of the keyway assembly 115, as the tapered shapes assist in displacing the axle 125 out of the locked position 1500. Additionally, the tapered shapes of the keyway assembly 115 and the key assembly 130 can take up slack in the interference-engagement that would otherwise be inherent in the clearance necessary to slidingly engage and disengage the kayak holder 100 between closed, stored configuration 2000 and the open, kayak-receivable configuration 1000.

Figure 10:
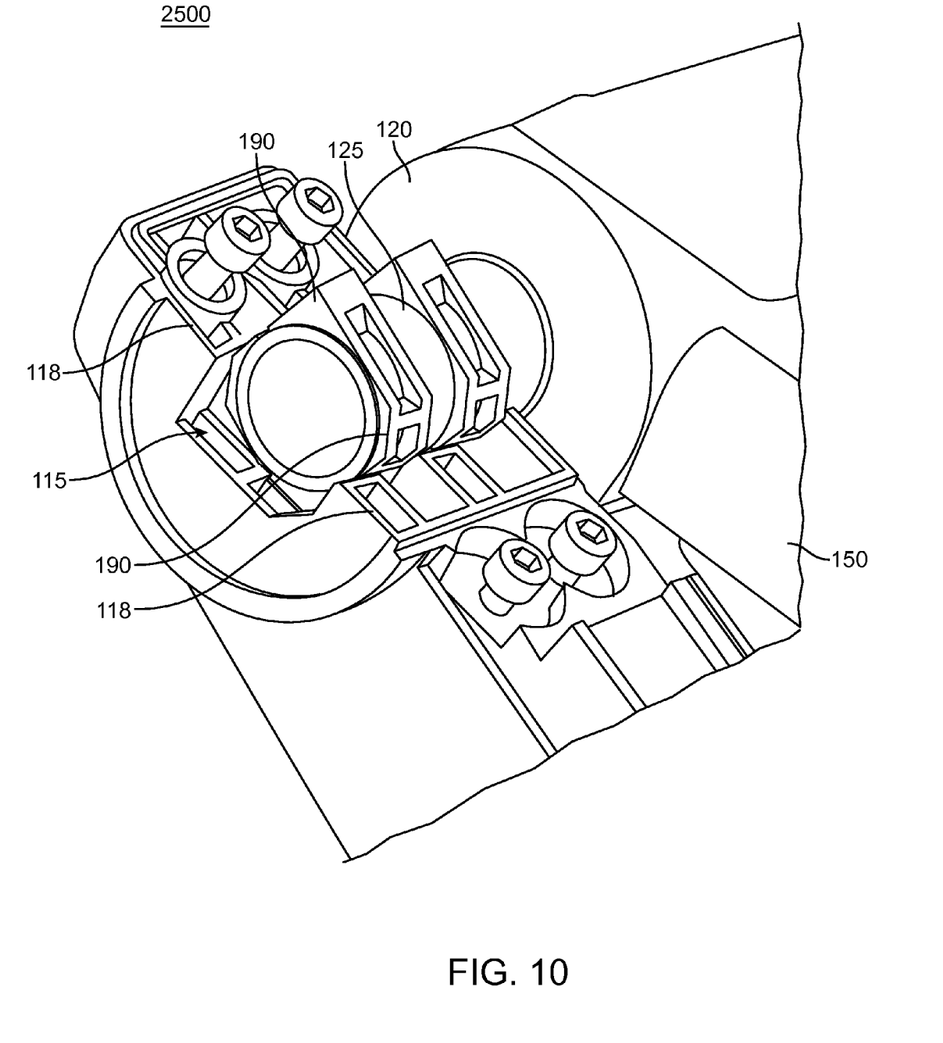
Figure 11:
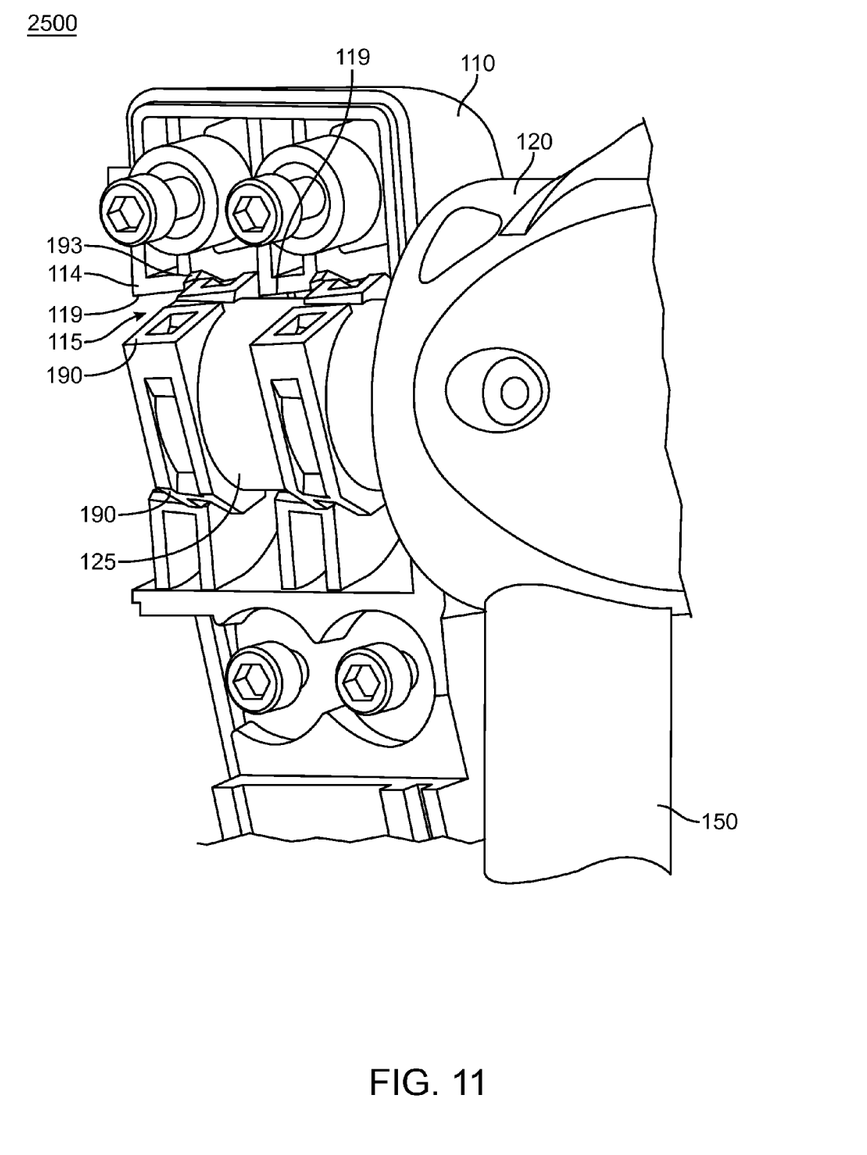

FIGS. 10 and 11 illustrate the elongate support arm 150 in the unlocked position 2500, where the elongate support arm 150 has been rotated towards the base 110. FIG. 10 is a perspective view, and FIG. 11 is a top view. In the example embodiment illustrated in FIGS. 10 and 11, the elongate support arm 150 has been rotated such that the elongate support arm 150 forms an angle with respect to the base 110. For example, the angle can be about 10 degrees, 5 degrees, 15 degrees, 17 degrees, 20 degrees, or any other angle. As illustrated in FIGS. 10 and 11, since the key assembly 130 has been axially displaced from the locked position 1500 out of interference engagement with the keyway assembly 115, the key assembly 130 is able to rotate within the base 110 without interference with another surface of member. As can be seen more clearly in FIG. 10, the axle 125 includes an abutting engagement assembly 190. The abutting engagement assembly 190 can be formed on at least a portion of the key assembly 130. The abutting engagement assembly 190 is adapted to abuttingly engage a lip portion 191 (shown in FIG. 13) of the keyway assembly 115. In FIGS. 10 and 11, the abutting engagement assembly 190 can be a surface of the key assembly 130. In other embodiments, the abutting engagement assembly 190 can be protrusions formed on the axle 125 or formed on at least a portion of the key assembly 130.

Also, more clearly illustrated in FIG. 11 is the detent 193. As illustrated in FIG. 1, the keyway assembly 115 includes the detent 193, which will be described in further detail below.

Figure 12:
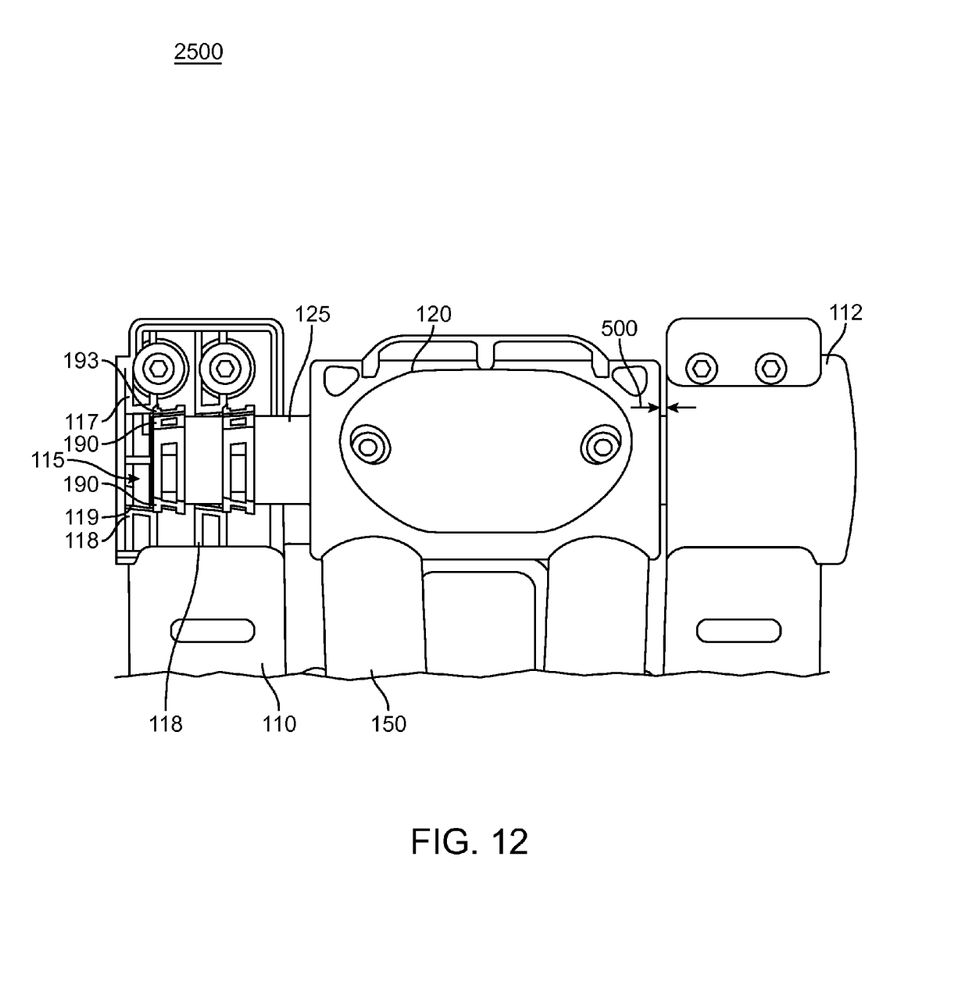
FIG. 12 is a cut-away view of a kayak holder, in accordance with an example embodiment of the present disclosure, illustrating the keyway assembly and the key assembly when the kayak holder is in the closed, stored configuration.

FIG. 12 illustrates the kayak holder 100 in the closed, stored configuration 2000. In the example embodiment illustrated in FIG. 12, the elongate support arm 150 has been rotated towards the base 110 such that the elongate support arm 150 is substantially parallel with the base 110. In FIG. 12, the key assembly 130 of the axle 125 is displaced out of interference-engagement with the keyway assembly 115 of the base 110. Also illustrated in FIG. 12, the kayak holder 100 is yieldingly restrained in the closed, stored configuration 2000 by the interaction between the abutting engagement assembly 190 and a detent 193 of the lip portion 191 of the keyway assembly 115. For example, as the biasing member 400 (not shown) of the kayak holder 100 is biased to urge the elongate support arm 150 in the locked position 1500, when the elongate support arm 150 has been rotated to place the kayak holder 100 in the closed, stored position 2000, the biasing member 400 will urge the axle 125 and the elongate support arm 150 towards the lip portion 191 of the keyway assembly 115. As illustrated in FIG. 12, the detent 193 can be formed in the lip portion 191 of the keyway assembly 115. As the biasing member 400 is biased to urge the axle 125 towards the keyway assembly 115, the abutting engagement assembly 190 is urged towards the detent 193. In the closed, stored configuration 2000, the detent 193 can receive the abutting engagement assembly 190, which thereby yieldingly restrains the kayak holder 100 in the closed, stored configuration 2000.

Figure 13:
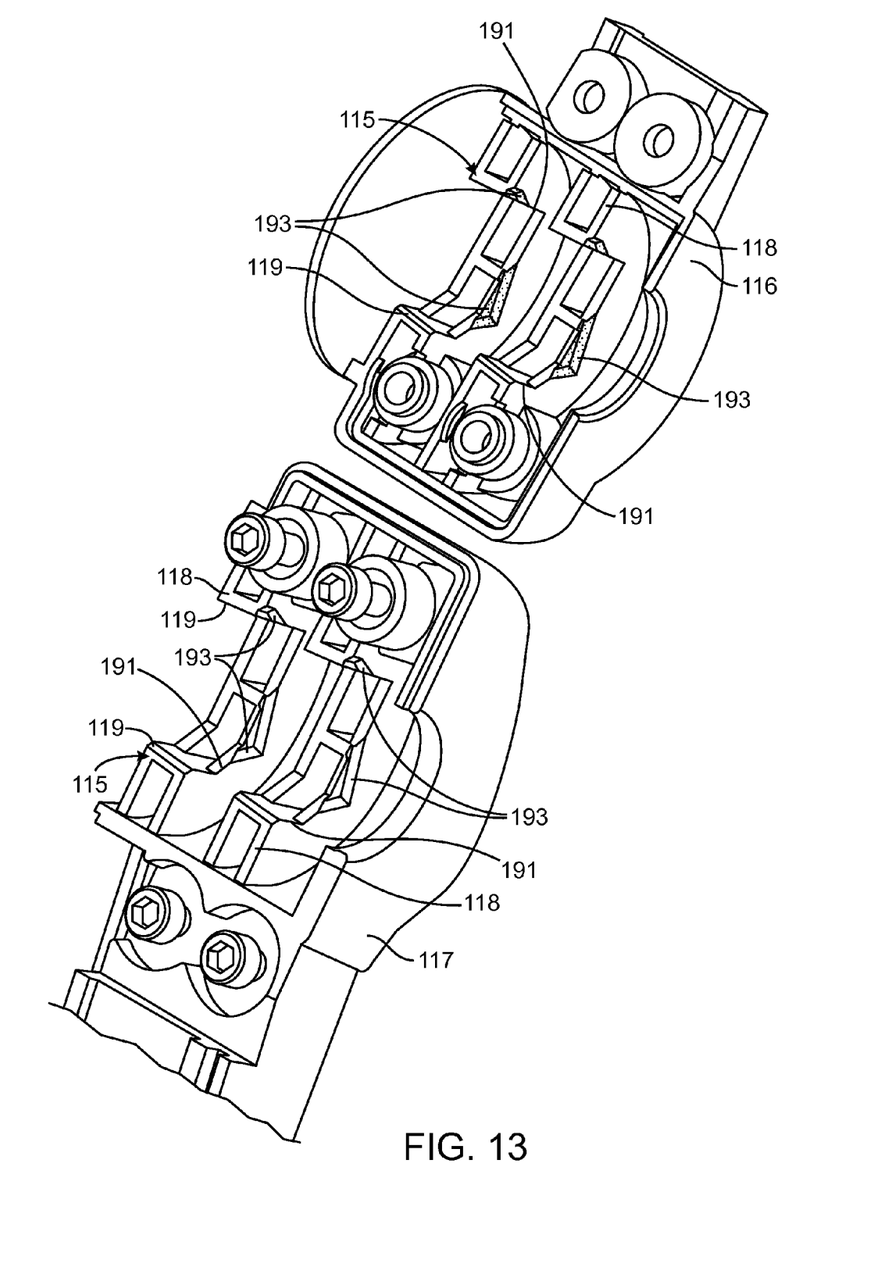
FIG. 13 is a partial view of the base of a kayak holder, in accordance with an example embodiment of the present disclosure, illustrating a top half and a bottom half of the keyway assembly.

FIG. 13 is a view of one of the ends of the base 110 illustrating the top half 116 and the bottom half 114 of the keyway assembly 115. As illustrated in FIG. 13, the keyway assembly 115 can have a top half 116 and a bottom half 114 formed in the base 110 of the kayak holder 100. However, those of ordinary skill in the art will appreciate that in at least one embodiment, the keyway assembly 115 can be formed in the base 110 and not the cover 112.

FIG. 13 also more clearly illustrates the lip portion 191 of the keyway assembly 115. In the example embodiment of FIG. 13, the lip portion 191 can be the edge of the keyway assembly 115. For example, the edge can be the edge of the blocking member 118 facing toward the hub 120. In FIG. 13, at least one detent 193 can be formed in the lip portion 191. The detent 193 can be shaped to correspond to the abutting engagement assembly 190 of the axle 125. The detent 193 can be shaped to bias the kayak holder 100 in the closed, stored configuration 2000 when the elongate support arm 150 has been rotated such that the elongate support arm 150 is substantially parallel with the base 110. For example, the detent 193 can have a cam surface shaped to bias the kayak holder 100 in the closed, stored configuration 2000. However, the detent 193 can be also be shaped such that the elongate support arm 150 remains in the substantially parallel orientation with the base 110 in the closed, stored configuration 2000. In another example, the detent 193 can be shaped such that when the user desires to place the kayak holder 100 in the open, kayak-receiving configuration 1000, the elongate support arm 150 can be rotated to overcome the bias of the detent 193 and thereby be urged by the biasing member 400 into the locked position 1500. For example, when the user desires to transition the kayak holder 100 from the closed, stored configuration 2000, to the open, kayak-receiving configuration 1000, the elongate support arm 150 can be rotated away from the base 110. The detent 193 can be configured to assist in moving the elongate support arm 150 into the locked position 1500, in which the elongate support arm 150 is in the substantially upright orientation. That is, the detent 193 can be shaped to urge the elongate support arm 150 towards a substantially upright orientation when sufficient force is applied to the elongate support arm 150 to move the abutting engagement assembly 190 out of abutting engagement with the detent 193. In other words, the detent 193 can include a first cam surface that biases the elongate support arm 150 towards the closed, stored configuration 2000 and a second cam surface that biases the elongate support arm 150 towards a substantially upright orientation with respect to the base 110 when sufficient force has been applied to the elongate support arm 150 to rotate the abutting engagement assembly 190 out of engagement with the detent 193. Although, FIGS. 12 and 13 illustrate the lip portion 191 comprising a detent 193, those of ordinary skill in the art will appreciate that the lip portion 191 can include a cam surface, a restraining member, or other structure or surface that can be configured to yieldingly restrain the kayak holder 100 in the closed, stored configuration 2000 when the elongate support arm 150 has been rotated towards the closed, stored configuration 2000.

The above described example embodiments of the presently disclosed kayak holder 100 provide the user with a kayak holder 100 that can be more easily transitioned between an open, kayak-receiving configuration 1000 and a closed, stored configuration 2000, as compared to conventional kayak holder 100. For example, as the kayak holder 100 includes a key assembly 130 and a keyway assembly 115 configured for interference-engagement, the elongate support arm 150 can be moved out of the locked configuration 1500 with minimal effort from the user. For example, the user is able to pull the elongate support arm 150 towards the side of the base 110 housing the biasing member 400 and out of the locked position 1500 with one hand, due at least in part to the complementary shapes of the key assembly 130 and the keyway assembly 115.

Example implementations have been described hereinabove regarding a kayak holder. While specific, example embodiments have been shown and described, various modifications to and/or departures from the disclosed embodiments will occur to those having skill in the art. One of ordinary skill in the art will also appreciate that the elements and features described and illustrated in the figures herein can be optionally included to achieve the benefits of the presently disclosed kayak holder. Additionally, those skilled in the art will appreciate that features in each of the figures described herein can be combined with one another and arranged to achieve the described benefits of the presently disclosed kayak holder. Various modifications to and departures from the disclosed implementations will occur to those having skill in the art. The subject matter that it is desired to protect is set forth in the following claims.

What is claimed is:

1. A kayak holder for a vehicle mounted load carrier configurable between an open, load-receiving configuration and a closed, stored configuration, the holder comprising:
   a base releasably mountable upon a load bar of a carrying vehicle;
   at least one support arm anchored to a hub having an axle rotatably coupled to the base;
   the base comprising a keyway assembly that releasably receives a mating key assembly on the axle; and
   a biasing member interposed between the axle and the base configured to bias the at least one support arm toward a locked position,
   wherein the at least one support arm is unidirectionally axially displaced relative to the base between the locked position and an unlocked position.

2. The kayak holder recited in claim 1, wherein:
   the unlocked position of the at least one support arm relative to the base comprising the key assembly axially displaced from the locked position out of interference-engagement with the keyway assembly,
   the locked position of the at least one support arm relative to the base comprising the mating key assembly interference-engaged in the keyway assembly.

3. The kayak holder recited in claim 1, wherein the key assembly comprises a key adapted to be located in a keyway of the keyway assembly, in the locked position, thereby blocking rotation of the at least one support arm relative to the base.

4. The kayak holder recited in claim 3, wherein the key is conformance-fit in the keyway thereby preventing rotation of the at least one support arm relative to the base.

5. The kayak holder recited in claim 4, wherein the key and keyway have complementarily tapered exterior and interior shapes, respectively, that flush-engage one with the other in the locked position.

6. The kayak holder as recited in claim 5, wherein the key is a square protrusion formed on the axle.

7. The kayak holder recited in claim 5, wherein the keyway comprises a pair of blocking members symmetrically and radially positioned about the axle.

8. The kayak holder recited in claim 7, wherein the pair of blocking members of the keyway are mirror images, one to the other, on opposite lateral sides of the axle.

9. The kayak holder recited in claim 7, wherein the pair of blocking members are square protrusions formed on the keyway assembly of the base.

10. The kayak holder recited in claim 5, wherein the kayak holder comprises a single locked position.

\* \* \* \* \*